United States Patent [19]

Wu

[11] Patent Number: 4,888,180
[45] Date of Patent: Dec. 19, 1989

[54] A METHOD OF PREPARING GRAIN CAKES

[75] Inventor: Rei-Young Wu, Palatine, Ill.

[73] Assignee: The Quaker Oats Company, Chicago, Ill.

[21] Appl. No.: 154,683

[22] Filed: Feb. 10, 1988

[51] Int. Cl.$^4$ .................. A23L 1/18; A23R 1/14
[52] U.S. Cl. .................. 426/618; 426/445; 426/447; 426/454; 426/461
[58] Field of Search .............. 426/618, 453, 454, 447, 426/445, 461

[56] References Cited

U.S. PATENT DOCUMENTS

| | | |
|---|---|---|
| 1,945 | 5/1865 | Schenck . |
| 348,320 | 8/1886 | Finke . |
| 2,195,165 | 3/1940 | Choprin et al. . |
| 2,653,099 | 9/1953 | Carman et al. . |
| 2,653,100 | 9/1953 | Carman et al. . |
| 3,650,763 | 3/1972 | Touba . |
| 4,281,593 | 8/1981 | Gevaert . |
| 4,328,741 | 5/1982 | Yoshikazu . |
| 4,361,593 | 11/1982 | Brooks et al. . |
| 4,667,588 | 5/1987 | Hayashi . |
| 4,734,289 | 3/1988 | Yamaguchi et al. .............. 426/808 |

FOREIGN PATENT DOCUMENTS 799316 5/1973 Belgium .
868361 6/1978 Belgium .

Primary Examiner—Donald E. Czaja
Assistant Examiner—Mary S. Mims
Attorney, Agent, or Firm—Daniel W. Latham

[57] ABSTRACT

An improved grain cake, method and apparatus. In the prior art, rice cakes have been made by heating a predetermined quantity of rice grains in a hermetically sealed chamber at superatmospheric pressure and then expanding the heated rice grains while they are confined to the chamber by abruptly releasing the superatmospheric pressure such that the confined, expanded grains bond together to form a self-supporting mass. The improvement of this invention comprises pretreatment of cereal grains, including rice, wheat, rye, corn and the like, by steaming the cereal grains to bring them to an effective temperature to partially gelatinize the starch therein and to maintain the cereal grains at the effective temperature for an effective period of time to produce a desired degree of expansion when puffed in a conventional rice cake machine. The resulting grain cakes have increased expansion and reduced fragility over those made by prior art pretreatment methods.

21 Claims, 2 Drawing Sheets

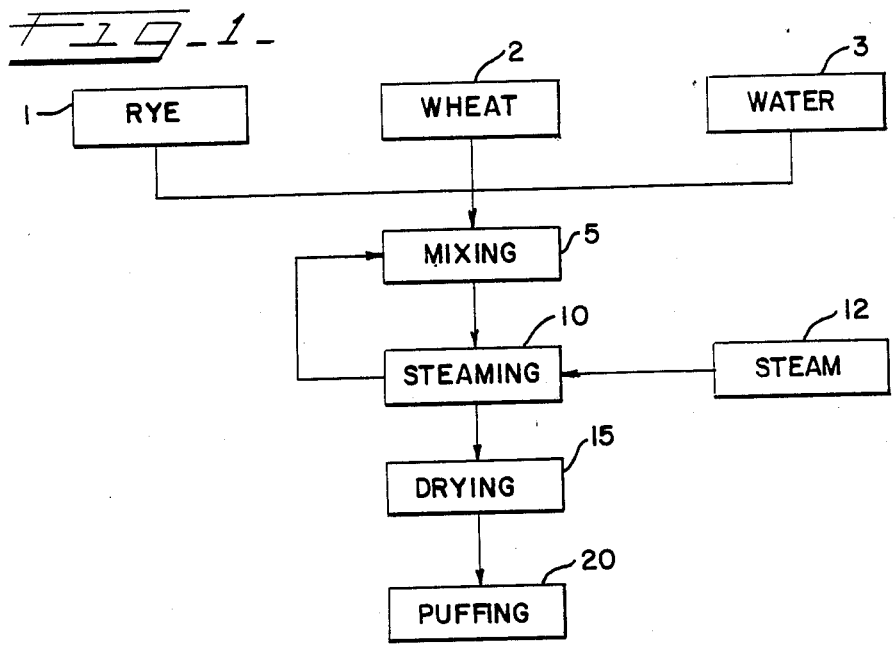
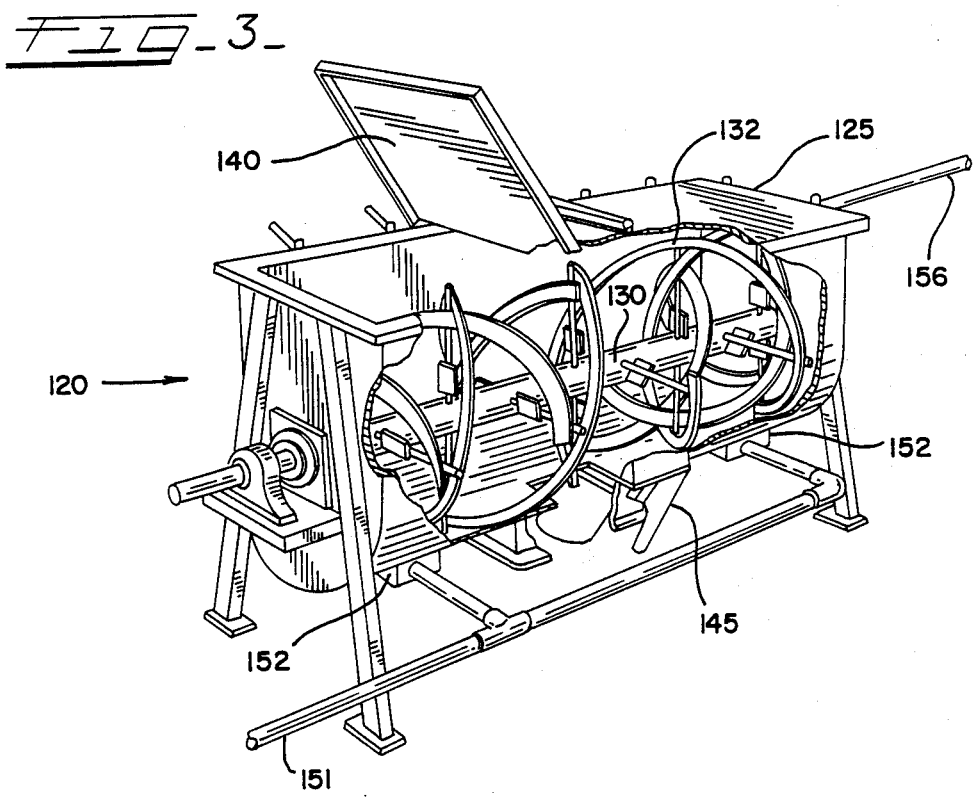

A METHOD OF PREPARING GRAIN CAKES

BACKGROUND

The present invention relates to puffed food products made from cereal grains in the shape of a small cake or cracker, and the method and apparatus for their manufacture.

Cereal puffing methods are well established in the prior art. For example, gun puffing has long been used to produce discrete, highly expanded cereal products such as puffed wheat or puffed rice. In a typical gun puffing operation, a raw whole grain is placed into a relatively large chamber and a hinged lid is secured. The chamber is then pressurized with steam. After a time, when the chamber has reached a desired pressure and temperature, a lid release mechanism is activated which allows the lid to open suddenly. In the resulting explosion of steam and grain from the chamber, individual grain particles become plastic and undergo rapid expansion until they are many times larger than they were when first placed into the chamber. During the time when the cereal grains are expanding, they are inherently cohesive and adhesive but they do not bond together because the grain particles have little opportunity to contact each other. They are propelled separately from the puffing chamber while they are in the cohesive/adhesive condition and therefore have no opportunity to become bonded together.

Similarly, puffing methods which do not add moisture to the grains during the puffing process but which instead rely only on the moisture in the cereal grains are also well known in the art. An example of such a method is the expansion of cereal grains (especially rice) in an enclosed chamber to produce a puffed food product in the shape of a small cake or cracker.

The apparatus capable of forming such rice cakes is well known. For example, in the 1973 patent to Omer Gevaert (Belgian Patent No. 799,316) an apparatus is disclosed in which a measure of cereal grains is mechanically fed onto a heated piston. The piston and cereal grains are then advanced by a hydraulic cylinder into a heated female mold to create a small, hermetically sealed chamber enclosing the cereal grains. Heat and superatmospheric pressure are thereby applied to the cereal grains until, at a predetermined time, the pressure in the chamber is suddenly released by retracting the hydraulic cylinder. The suddenly depressurized chamber is not, however, sufficiently opened to release the cereal grains by the retracting of the cylinder, but is instead retained in a substantially closed but vented position by a locking device. Therefore, as the pressure is released, the cereal grains expand to substantially fill the chamber and while still in the plastic state bond together to form a small cake or cracker. The locking device is then released, the piston is fully retracted to open the chamber, and the cake is mechanically ejected. Similar devices are disclosed in U.S. Pat. Nos. 4,281,593 issued to Gevaert, 4,328,741 issued to Yoshikazu and 4,667,588 issued to Hayashi.

These cake-forming devices are most frequently used with rice as the cereal grain since rice is capable of relatively easy expansion into a self-supporting cake. The rice used in the process is typically pretreated by washing and tempering steps. For example, in U.S. Pat. No. 4,328,741, the rice at a moisture content of about 15% to 16% is first cleaned by a rice washing machine and received in a basket to be left for 15 to 20 minutes to remove water. The moisture content of the rice immediately after washing is about 30%. Following the addition of salt to the rice, it is dried for a day and then is further dried in a drying machine for two or three hours to a moisture content in the range of 15% to 20%. The rice thus prepared is then ready to be loaded into the rice cake apparatus.

Even though rice pretreated by moisture adjustment and tempering as employed in the prior art expands to form cohesive rice cakes when expanded in a rice cake machine, other cereal grains, when essentially the same pretreatment is applied, expand less readily and form cakes which are both more dense and more fragile than rice cakes. Another problem with the pretreatment of rice by moisture adjustment and tempering as practiced in the prior art is the time required to temper the rice. Yet another problem with prior art rice cakes is their relative fragility and susceptibility to breakage during packaging and shipment.

It is therefore an object of the present invention to provide a grain cake from such cereal grains as wheat, rye, corn, oats, millet, sorghum, barley and buckwheat in which the cereal grains are more highly expanded than those in the prior art.

It is also an object of the present invention to provide a grain cake from such cereal grains as wheat, rye, corn, oats, millet, sorghum, barley and buckwheat which is less fragile than those in the prior art.

It is also an object of the present invention to provide a method for making grain cakes from such cereal grains as wheat, rye, corn, oats, millet, sorghum, barley and buckwheat which employs the same puffing apparatus now used to make rice cakes.

It is also an object of the present invention to provide a grain cake from rice which is less fragile than those in the prior art and less susceptible to breakage during packaging and shipment.

It is also an object of the present invention to provide a method for making grain cakes from rice, wheat, rye, corn, oats, millet, sorghum, barley and buckwheat in which the time required for their pretreatment is reduced.

It is also an object of the present invention to provide an apparatus for pretreatment of such cereal grains as rice wheat, rye, corn, oats, millet, sorghum, barley and buckwheat for the manufacture of grain cakes.

SUMMARY OF THE INVENTION

These and other objects are accomplished by the present invention. I have discovered in a method for making a puffed, cake-shaped food product by heating a predetermined quantity of cereal grains in a hermetically sealed chamber at superatmospheric pressure and then expanding the heated grains while they are confined to the chamber by abruptly releasing the superatmospheric pressure such that the confined, expanded grains bond together to form a self-supporting mass, an improvement which comprises pretreatment of the cereal grains by steaming the cereal grains to bring them to an effective temperature to partially gelatinize the starch therein and to maintain the cereal grains at the effective temperature for an effective period of time to produce a desired degree of expansion in the final product.

In a preferred embodiment of the present invention, the moisture content of the cereal grains is first adjusted by adding any water needed to bring the desired cereal grains or cereal grain mixture to a moisture content in the range of about 12% to about 18%. In some cases, the cereal grains may be stored at a moisture in the desired range and will not require the addition of water. While the cereal grains are in an unpressurized container, steam is applied to the grains. Steam at a pressure of about 35 psi could be used to initially raise the temperature of the grains into the desired range followed by steam at a pressure of about 15 psi to continue the steaming of the cereal grain for the desired period of time. The steaming takes place for a period of time and at a temperature required to partially gelatinize the starch in the grain. That time and temperature depends on the particular cereal grain which is being steamed, the moisture content of the cereal grain and the desired degree of expansion in the final product. For example, wheat at a moisture content of 14% could be steamed at about 205 degrees F. for about four minutes to produce a highly expanded product. Also, for example, corn at a moisture content of 15% could be steamed at about 205 degrees F. for about 20 minutes to produce a highly expanded product. Following steaming, the cereal grain is preferably dried to a moisture content of less than about 18% to facilitate loading of the steamed cereal grains into the cake-forming apparatus.

The following detailed description further describes preferred embodiments of the invention to those skilled in the art and further distinguishes the invention from the prior art.

BRIEF DESCRIPTION OF THE DRAWINGS

FIG. 1 is a flow sheet drawing showing the various steps employed in an embodiment of the present invention.

FIG. 3 is partly cut-away perspective view of the steamer apparatus of FIG. 2.

DETAILED DESCRIPTION OF THE DRAWINGS

Figure 2:
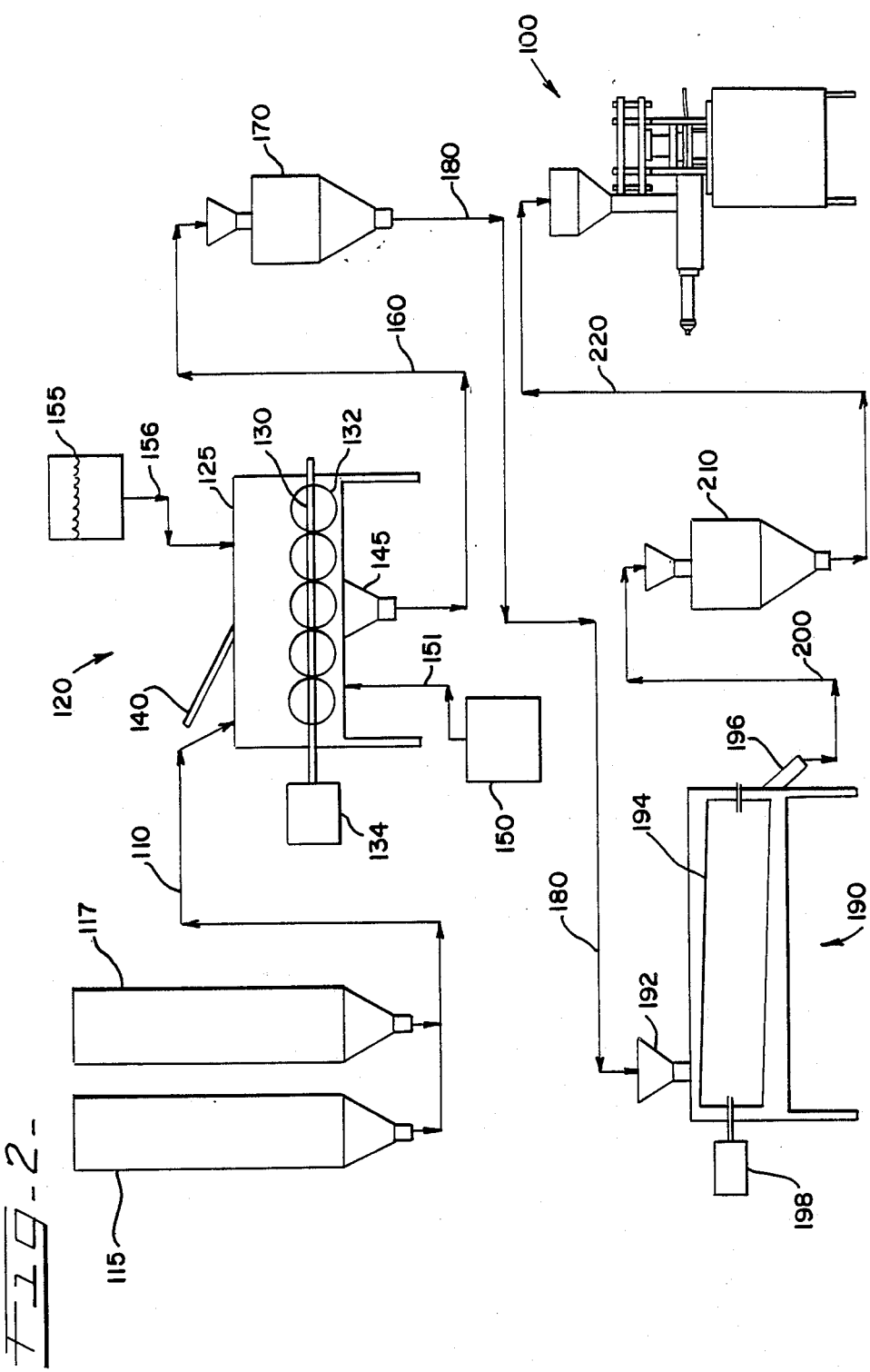
FIG. 2 is a schematic drawing showing an industrial embodiment of the present invention.

Referring to FIG. 1, the cereal grains rye 1 and wheat 2 are first combined with water 3 to adjust the moisture of the cereal grains into the desired range. These ingredients are typically combined by mixing 5 the rye 1 wheat 2 and water 3 for a short period. The combined ingredients are then subjected to steaming 10. Steam 12 is admitted to a steamer until the temperature of the combined ingredients has been raised to the desired level and until the grain has been steamed for the desired period of time. Further mixing 5 may be undertaken during steaming 10 in order to provide a uniform temperature to the combined ingredients. Following steaming 10, drying 15 of the mixed ingredients may be undertaken to bring the moisture content of the mixed ingredients into a desired range. The dried ingredients are then ready for puffing 20 in a conventional rice cake machine.

Referring now to FIG. 2, the present invention may be practiced industrially such that one or more rice cake machines 100 can be continuously supplied with ingredients treated in accordance with the present invention. The process of the present invention is started by sending untreated ingredients by a conveyor 110 from storage bins 115, 117 into a steamer 120. The untreated ingredients can include the cereal grains and any other materials desired in the final product. The steamer 120 includes a chamber 125 and a shaft 130 with attached agitator blades 132 (the agitator blades may be those of a conventional ribbon blender). The shaft 130 extends axially along the chamber 125 and may be rotated by a motor 134. The steamer 120 also contains a hinged cover 140 to admit untreated ingredients and an closeable outlet 145. The steamer 120 is also connected to a source of steam 150, and a source of water 155 by steam lines 151 and water lines 156 respectively.

Still referring to FIG. 2, in operation, while the closeable outlet 145 remains closed, the steamer 120 is provided with untreated ingredients from the storage bins 115, 117 through the conveyor 110 and sufficient water 155 is provided through the water lines 156 to raise the moisture content of the untreated ingredients into the desired range. The motor 134 is then activated for a short period of time to turn the shaft 130 and agitator blades 132, thereby mixing the contents of the steamer 120. Following this short mixing period, steam 150 is admitted through the steam lines 15 to the steamer 120 while the motor 134 is activated intermittently or very slowly to promote even heating of the ingredients.

When the untreated ingredients have been steamed at the desired temperature and for the desired time, the closeable outlet 145 is opened and the steamed ingredients which include cereal grains in which starch has been partially gelatinized, are transferred by conveyor 160 to a first surge tank 170, and then by conveyor 180 to a rotary dryer 190 of conventional design having an inlet 192, a rotatable drum 194, and outlet 196, a motor 198 for rotating the drum 194 and, Optionally, a source of heat (not shown). During the drying operation, the addition of heat to the dryer 190 may not be required since the steamed ingredients normally retain sufficient heat from the steaming step to dry them to a desired moisture content.

When the dried and cooled, the treated ingredients which include cereal grains in which starch has been partially gelatinized, are discharged from the dryer 190 and sent by conveyor 200 into a second surge tank 210 and then from the second surge tank 210 by conveyor 220 to individual rice cake machines 100. It should be noted that although FIG. 2 may give the impression that the equipment depicted is operated in a continuous rather than a batch mode, it should be apparent from the above description that individual pieces of equipment can be operated in a batchwise process while the surge tanks can, if desired, provide for a continuous supply of treated ingredients to the rice cake machines 100.

Referring now to FIG. 3, the steamer 120 includes a chamber 125 and a shaft 130 with attached agitator blades 132 (the agitator blades may be those of a conventional ribbon blender). The shaft 130 extends axially along the chamber 125 and may be rotated by a motor (not shown). The steamer 120 also has a hinged cover 140 which may be opened to admit untreated ingredients to the steamer 120 and a closeable outlet 145. The steamer 120 is also connected to a source of steam (not shown) connected by a steam line 151 to spargers 152 and a source of water (not shown) connected by a water line 156.

DETAILED DESCRIPTION OF THE INVENTION

The grain cakes of the present invention are made in a conventional rice cake machine by heating a predetermined quantity of cereal grains in a hermetically sealed chamber at superatmospheric pressure and then expanding the heated grains while they are confined to the chamber by abruptly releasing the superatmospheric pressure such that the confined, expanded grains bond together to form a self-supporting mass. The improvement of the present invention comprises pretreatment of the cereal grains by steaming the cereal grains to bring them to an effective temperature to partially gelatinize the starch therein and to maintain the cereal grains at that temperature for an effective period of time to produce a desired degree of expansion in the final product. The improvement may also comprise a step in which water is added to the cereal grains to bring them into a desired moisture range for steaming and a step in which the cereal grain is dried to a desired moisture content after steaming. The resulting grain cakes have improved properties over those made by methods taught in the prior art, including improved expansion and reduced fragility.

The apparatus for forming rice cakes referred to herein is a conventional apparatus for forming rice cakes which employs the steps of heating a predetermined quantity of cereal grains in a hermetically sealed chamber at superatmospheric pressure and then expanding the heated grains while they are confined to the chamber by abruptly releasing the superatmospheric pressure such that the confined, expanded grains bond together to form a self-supporting mass. Machines which form rice cakes by this method are as disclosed in U.S. Pat. Nos. 4,281,593 issued to Gevaert or as disclosed in 4,328,741 issued to Yoshikazu or as disclosed in 4,667,588 issued to Hayashi. These patents are hereby incorporated by reference.

The term cereal grains as used herein refers to the seeds or fruits of the various cereal grasses and shall specifically include rice, wheat, corn, rye, oats, millet, sorghum, barley and buckwheat. Such cereal grains need not be used whole in the present invention, but may instead be processed to remove the hull, husk or germ portion of the seed or to be ground to a desired size. The most preferred cereal grains include pearled durham wheat, long-grained brown rice, and degerminated coarse ground yellow corn. To provide satisfactory grain cakes with cereal grains such as oats which are known to expand poorly in conventional gun puffing, they should be used in the present invention only in grain cake formulations which combine them with major amounts of other cereal grains.

Referring again to FIG. 1 but now in greater detail, cereal grains such as rye 1 and wheat 2 may first be combined with water 3 to adjust the moisture of the cereal grains into a desired range. The desired moisture content is a moisture content which will provide both the desired degree of expansion in the final product and which will be capable of being easily handled once the cereal grains have been steamed (in some cereal grains, high moisture contents can cause the cereal grains to stick together after steaming). Moisture contents in the range of about 12% to about 18% have been found to be acceptable and a moisture content in the range of about 14% to about 16% is preferred for the most common cereal grains such as corn, wheat or rice, although the moisture requirement for the best result in the final product may vary according to the cereal grain used. If the moisture content of the cereal grain is already in a desired range, no water is to be added. If the moisture content of the cereal grain is below a desired range, the ingredients can be combined and moistened by mixing 5 the cereal grains such as rye 1 and wheat 2 together with an appropriate quantity of water 3 to produce the desired moisture content. A short mixing time with gentle mixing is desired to prevent breakage of the cereal grains which would produce fine cereal pieces in the final product. A mixing time of about one minute in a ribbon blender has been found to be acceptable. Other mixing times and methods can also be used as those skilled in the art will readily appreciate.

The combined ingredients are then subjected to steaming 10. The steaming 10 is preferably conducted in a steamer with the same capability for gentle mixing as that described above. The steaming 10 and mixing 5 are also preferably and conveniently conducted in the same combined steaming and mixing apparatus. Steam 12 is admitted to the steamer to raise the temperature of the combined ingredients to the desired level. The desired temperature for the present invention is an effective temperature to partially gelatinize starch in the cereal grains.

The term "effective temperature to partially gelatinize" or the term "effective temperature" as used herein means a temperature required, if applied for a period of time, to heat and swell starch granules such that the starch granules become softer, more flexible, and readily digestible by enzymes, even though the starch granules may retain much of their crystallinity and may not have lost birefringence when viewed under a polarizing microscope. The term alphalyzation is sometimes used interchangeably with the term partial gelatinization in the cereal processing art in connection with these effects. Complete gelatinization of the starch (loss of birefringence) could also result in the present invention at the effective temperature if the moisture content in the cereal grains were sufficient to permit gelatinization. At the preferred moisture contents of the present invention, however, (about 12% to about 18% in the cereal grain prior to steaming) gelatinization is inhibited and, as a result, the cereal grains are only partially gelatinized. The "effective temperature to partially gelatinize" or the "effective temperature" is therefore essentially the same as the temperature required to gelatinize the starch in the cereal grains as set forth in standard reference works. Accordingly, the temperature required in the present invention is at or above the well known gelatinization temperature for the particular cereal grains being steamed. According to Osman (Osman, E. M. in Starch: Chemistry and Technology, Vol. II, P. 163, R. L. Whistler and E. F. Paschall, eds., Academic Press, New York, 1967) the gelatinization temperature for wheat is in the range of about 59.5–64 degrees C., the gelatinization temperature for corn is in the range of about 62–70 degrees C. and the gelatinization temperature for rice is in the range of about 68–78 degrees C. Therefore, temperatures at or above these gelatinization temperatures must be employed as an "effective temperature to partially gelatinize" or "effective temperature" in the present invention.

Temperatures above the gelatinization temperatures identified above are generally preferred in order to shorten the time required to provide the desired treatment to the cereal grains. Preferred steaming temperatures are in the range of about 190 degrees F. to about 210 degrees F. since these temperatures are adequate to provide a short processing time and since they are the highest temperatures that can be readily achieved by steaming in inexpensive unpressurized equipment. Higher or lower temperatures can, however, be used in the present invention, as desired. The steam provided to the steamer can be at a wide range of pressures. For example, 50 psi steam or 15 psi steam could be used. A preferred procedure for steaming is to use higher pressure steam initially, for example, 30-50 psi steam, to rapidly bring the cereal grain to a temperature in the preferred range (e.g. 190-210 degrees F.) and then to use steam at pressures up to about 15 psi to maintain that temperature for the desired processing time. This dual pressure steaming provides a rapid processing cycle for the cereal grain in the steamer.

Mixing 5 is preferably undertaken during steaming 10 in order to provide a uniform temperature to the cereal grains. When following the preferred dual pressure steaming procedure heretofore described, the preferred procedure is to mix intermittently or very slowly while the higher pressure steam is applied and then to leave the mixer off when the lower pressure steam is applied. For example, the mixer could be run on a one minute on three minute off pattern to provide adequate temperature uniformity in the cereal grains during the initial steaming phase.

Once the cereal grain has reached an effective temperature during steaming 10 to partially gelatinize the starch therein, it is to be maintained at the effective temperature for an effective period of time to partially gelatinize the starch in the cereal grains to the extent required to produce a desired degree of expansion in the final product. The effective period of time can vary substantially according to the desired degree of expansion in the final product, the particular cereal grain being steamed and the moisture content of the grain. If a relatively great degree of expansion of cereal grains is desired in the final product, a longer period of time for steaming may be required. Also, if the moisture content of the cereal grains is relatively low, a relatively longer period of time for steaming would be required to achieve the same degree of expansion in the cereal grains. When steamed according to the preferred steaming procedure recited above, an effective period of time required for a high degree of expansion in wheat and rye can be about two minutes to eight minutes while the effective period of time required for a high degree of expansion in corn can be about ten minutes to thirty minutes. The moisture content of the cereal grains following the preferred steaming procedure is typically in the range of about 18% to 25%.

It will be readily recognized by those skilled in the art that although the preferred embodiment disclosed above employs cereal grains which have been premixed prior to steaming 10, the present invention can also be practiced by treating individual cereal grains in accordance with this invention and then mixing them in the proportions desired in the final grain cake product. It will also be recognized that either preceding or following steaming 10, the cereal grains may be mixed with seasonings to produce a desired flavor, texture or appearance in the final product. For example, salt, flavors or colors may be added either before or after steaming 10. Also, for example, cereal grains which are not desired to be greatly expanded in the final product may be combined with cereal grains which have been treated in accordance with the present invention.

Drying 15 of the steamed ingredients may then be undertaken to bring the moisture content of the steamed ingredients into a desired range. Although drying 15 is not required in the present invention to produce a highly expanded grain cake, a drying step is usually desirable in order to improve the behavior of the steamed cereal grain in mechanical handling systems. Cereal grain at moisture contents above about 18% tends to clump and stick during mechanical conveying. In particular, it can produce uneven feeding in conventional rice cake machines. By drying the cereal grains to a moisture content below about 18%, their mechanical handling can be considerably improved. This can be accomplished in conventional rotary drying equipment suitable for use with cereal grains. Since the steamed cereal grains are at a high temperature as they exit the steamer, drying 15 can usually be accomplished with the addition of very little or no heat from the dryer.

The dried ingredients are then ready for puffing 20 in a conventional rice cake machine as heretofore described. No modifications to the rice cake machine are required to make grain cakes from the dried ingredients. As those skilled in the art will readily appreciate, minor changes in operating conditions such as temperature and closing pressure for the puffing chamber may be desired for optimum operation.

Referring again to FIG. 2 and FIG. 3 but now in greater detail, the present invention may be practiced industrially such that one or more rice cake machines 100 can be continuously supplied with treated ingredients which include cereal grains in which starch has been partially gelatinized. The process of the present invention is started by sending untreated ingredients by conveyor 110 from storage bins 115, 117 into a steamer 120. The untreated ingredients can include the cereal grains and any other materials desired in the final product. For example, wheat and rye can be taken from bulk storage bins 115, 117 and individually metered into the conveyor 110 by conventional means. Alternatively, wheat, rye and other materials could be premixed prior to being metered into the conveyor 110 and then into the steamer 120.

The steamer 120 includes a chamber 125. Although not required in the present invention, the chamber 125 may, if desired, be a chamber capable of containing steam at superatmospheric pressure and may be insulated to reduce heat loss during operation. The steamer 120 also includes a shaft 130 with attached agitator blades 132 (the agitator blades may be those of a conventional ribbon blender). The shaft 130 extends axially along the chamber 125 and may be rotated by a motor 134. The steamer 120 also has a hinged cover 140 which may be opened to admit untreated ingredients and an closeable outlet 145. The steamer 120 is also connected to a source of steam 150 connected by at least one steam line 151 and a source of water 155 connected to the steamer by at least one water line 156. Spargers 152 allow steam to enter the chamber 125 while preventing ingredients from entering the steam lines 151. The steam lines 151 should be free of condensate and the steamer 12 itself should be substantially dry when the untreated ingredients are conveyed into the steamer 120.

Still referring to FIG. 2, in operation, while the closeable outlet 145 remains closed, the steamer 120 is provided with untreated ingredients from the conveyor 110 and sufficient water 155 to raise the moisture content of the untreated ingredients into the desired range. The amount of water to be added is the difference between the amount of water in the untreated ingredients and the amount of water desired in the untreated ingredients during steaming. The moisture content of untreated ingredients can be determined while they are in storage by conventional methods and equipment for determining the moisture content of cereal grains. A moisture content for ingredients to be steamed in the range of about 12% to about 18% has been found to be acceptable and a moisture content in the range of about 14% to about 16% is preferred. Of course, if the moisture content of the untreated ingredients is in the desired range, no additional water must be added. If water is added, the motor 134 is then activated for a short period of time to turn the shaft 130 and agitator blades 132, thereby gently mixing the water and untreated ingredients in the steamer 120. As those skilled in the art will readily recognize, the use of the steamer 120 for the mixing of water and untreated ingredients is merely a matter of convenience. Other methods for adjusting the moisture of grain products would be equally applicable to the present invention. No tempering period prior to steaming is required.

Following this short mixing period, steam is admitted to the steamer 120 while the motor 134 is activated intermittently to promote even heating of the ingredients. The desired temperature for the ingredients in the present invention is an effective temperature to partially gelatinize the starch in the cereal grains as heretofore described. Preferred steaming temperatures are in the range of about 190 degrees F. to about 210 degrees F. and most preferably in the range of about 200 degrees F. to about 210 degrees F. since these temperatures are adequate to provide a short processing time and since they are the highest temperatures that can be readily achieved by steaming in an inexpensive unpressurized steamer 120. A thermocouple inserted into the mass of ingredients as they are being steamed can be used to determine whether an effective temperature has been achieved. Higher or lower temperatures than the preferred temperatures above can, however, be used in the present invention, as desired and as permitted by the steamer 120 design. The steam provided to the steamer 120 is initially preferably higher pressure steam, for example, 30–50 psi steam and most preferably about 35 psi, to rapidly bring the cereal grain to a temperature in the preferred range (e.g. 190–210 degrees F.) and preferably steam up to about 15 psi thereafter.

Once the cereal grain has reached an effective temperature in the steamer 120 to partially gelatinize the starch therein, that temperature or a higher temperature is to be maintained in the steamer 120 for an effective period of time to produce a desired degree of expansion in the final product as heretofore described. For example, an effective period of time required for a high degree of expansion in wheat and rye can be about two minutes to eight minutes and preferably about four minutes while the effective period of time required for a high degree of expansion in corn can be about ten minutes to thirty minutes and preferably about twenty minutes.

When the untreated ingredients have been steamed at the desired temperature and for the desired time, the steam supply is turned off and the closeable outlet 145 is opened. As the steamed ingredients which include cereal grains in which starch has been partially gelatinized are discharged from the steamer 120, they are transferred to conventional grain handling equipment; for example, a convenient arrangement would be to transfer the steamed ingredients to a surge tank 170, and then to a dryer suitable for drying cereal grains, for example, a rotary dryer 190 having an inlet 192, a rotatable drum 194, an outlet 196, a motor 198 for rotating the drum 194. Conveyors 110, 160, 180, 200, 220 utilized in the industrial embodiment of the present invention can be conventional conveyors of various types suitable for use with cereal grains. It should be apparent to those skilled in the art that some of the conveyors described above could be eliminated depending upon the equipment used at the production facility and its arrangement within the production facility.

Although drying is not required in the present invention to produce a highly expanded grain cake, drying the steamed ingredients in a dryer 190 suitable for drying cereal grains is usually desirable in order to prevent uneven feeding in the rice cake machines 100. By drying the cereal grains to a moisture content below about 18% and preferably to a moisture in the range of about 14% to about 17%, its mechanical handling can be considerably improved. The addition of heat to the dryer 190 may not be required since the steamed ingredients normally retain sufficient heat from the steamer 120 to dry them. The steamed ingredients can usually be dried to a moisture content in the preferred range merely by tumbling them in the dryer 160 for about 10–15 minutes. As the treated ingredients 160 are discharged from an unheated dryer 190 they are typically at a temperature of about 70 degrees F. to about 90 degrees F. and a moisture content of about 14% to about 17%.

When dried and cooled as set forth above, the treated ingredients can be discharged from the dryer 190 to conventional grain handling equipment: for example, a convenient arrangement could be to transport the treated ingredients by conveyor 200 to a second surge tank 210 located near the dryer and then by conveyor 220 from the second surge tank 210 to the rice cake machines 100. As those skilled in the art will recognize, combinations of equipment other than that given above could also be used depending on the most desirable arrangement of equipment at the production facility.

The following examples illustrate and explain the present invention but are not to be taken as limiting the present invention in any way.

EXAMPLES 1–3

In an apparatus substantially as shown in FIG. 2 and FIG. 3 and as described above, grain cakes were made in accordance with the present invention by first sending untreated ingredients shown in Table 1 into an uninsulated, unpressurized steamer 120 having a 36 cubic foot capacity and ribbon blender agitator blades 132 ( a modified ribbon blender model DRB-36 made by American Process Systems Co., Gurnee, IL) while the closeable outlet 145 remained closed. Sufficient water 155 was added to raise the moisture content of the untreated ingredients as shown in Table 2. The motor 134 was then activated for one minute to turn the shaft 130 and agitator blades 132, thereby mixing the contents of the steamer 120. Following this short mixing period, 35 psi steam 150 was admitted to the steamer 120 while the motor 134 was activated intermittently on a one minute on, three minute off cycle to promote even heating of the ingredients until the desired temperature shown in Table 3 had been achieved. When the desired temperature of the ingredients had been achieved, 15 psi steam was applied to maintain the desired temperature.

When the untreated ingredients had been steamed at the temperature and for the time set forth in Table 3, the closeable outlet 145 was opened and the steamed ingredients, at a moisture content shown in table 4, were transferred to a 40 cubic foot surge tank and from there to rotary dryers 190 of conventional design (two Aeroglide model R1-30-10NEX dryers made by Aeroglide Corporation, Raleigh, NC connected in series) where the steamed ingredients were tumbled and dried to a moisture content and temperature shown in Table 4.

When the dried and cooled, the treated ingredients were discharged from the dryer 190 and transferred to a 60 cubic foot surge hopper and from there to individual rice cake machines 100. When puffed and dried to a moisture content of about 3.5%, the resulting grain cakes had the density and sheer strength given in Table 5.

TABLE 1

| EXAMPLE | Ingredient (LBS) | | | | |
|---|---|---|---|---|---|
| | RICE | WHEAT | CORN | RYE | TOTAL |
| 1 | | 1200 | | | 1200 |
| 2 | | 1080 | | 84 | 1164 |
| 3 | 588 | | 612 | | 1200 |

TABLE 2

| EX-AMPLE | INITIAL MOISTURE (%) | ADDED WATER (LBS) | FINAL MOISTURE (%) |
|---|---|---|---|
| 1 | 9 | 70 | 14 |
| 2 | 9 | 68 | 14 |
| 3 | 12 | 42 | 15 |

TABLE 3

| EXAMPLE | GRAIN TEMP (F.) | STEAMING TIME (MIN) | |
|---|---|---|---|
| | | 35 PSI | 15 PSI |
| 1 | 205 | 16 | 4 |
| 2 | 205 | 14 | 4 |
| 3 | 205 | 16 | 20 |

TABLE 4

| EX-AMPLE | STEAMED MOISTURE (%) | DRYING TIME (MIN) | DRIED MOISTURE (%) |
|---|---|---|---|
| 1 | 20 | 13 | 15 |
| 2 | 20 | 13 | 15 |
| 3 | 22 | 13 | 16 |

TABLE 5

| EX-AMPLE | DENSITY (OZ/CU.FT.)* | STRENGTH (LBS)** |
|---|---|---|
| 1 | 65 | 0.7 |
| 2 | 65 | 0.6 |
| 3 | 68 | 0.5 |

*Calculated by stacking 7 grain cakes.
**Measured by a shear tester made by John Chatillon & Sons, N.Y., NY - Model LTCM operated with a 3 inch blade at 3 inches per minute.

EXAMPLES 4-16

Grain cakes can also be made by the present invention from other cereal grains and at other processing conditions. In an apparatus substantially as shown in FIG. 2 and FIG. 3 and as described above, make grain cakes in accordance with the present invention by first sending untreated ingredients shown in Table 6 into a steamer 120 while the closeable outlet 145 remains closed. Add sufficient water 155 to raise the moisture content of the untreated ingredients as shown in Table 7. Activate the motor 134 for one minute to turn the shaft 130 and agitator blades 132, thereby mixing the contents of the steamer 120. Following this short mixing period, admit 35 psi steam 150 to the steamer 120 while the motor 134 is activated intermittently on a one minute on, three minute off cycle to promote even heating of the ingredients until the desired temperature in Table 7 has been achieved. When the desired temperature of the ingredients has been achieved, apply 15 psi steam to maintain the desired temperature.

When the untreated ingredients have been steamed at the temperature and for the time set forth in Table 7, open the closeable outlet 145 and transfer the steamed ingredients to a rotary dryer 190 of conventional design where the steamed ingredients are tumbled and dried.

When the dried to a moisture content below about 18% and cooled to a temperature below about 80 degrees F., discharge the treated ingredients from the dryer 190, transfer the treated ingredients to individual rice cake machines 100 and puff the ingredients into grain cakes.

TABLE 6

| EXAMPLE | GRAIN INGREDIENTS (LBS) | | | | | | | |
|---|---|---|---|---|---|---|---|---|
| | RICE | RYE | BARLEY | OATS* | WHEAT | CORN | MILLET | SORGHUM |
| 4 | 1200 | | | | | | | |
| 5 | | 1200 | | | | | | |
| 6 | 300 | | | | 300 | 600 | | |
| 7 | 250 | | 350 | 100 | 200 | 200 | 100 | |
| 8 | 1000 | | 50 | 50 | 50 | | 50 | |
| 9 | 50 | | 50 | 50 | 1000 | 50 | | |
| 10 | | | 600 | | 600 | | | |
| 11 | 600 | | 600 | | | | | |
| 12 | 200 | 150 | 150 | 100 | 200 | 100 | 50 | 250 |
| 13 | 200 | | 200 | 250 | 200 | 200 | | 150 |
| 14 | 200 | 250 | 200 | | 200 | 150 | 100 | 100 |
| 15 | 450 | 250 | | | 500 | | | |
| 16 | 200 | 150 | 150 | 100 | 200 | 100 | 250 | 50 |

*Oat groats

TABLE 7

| EX-AMPLE | PRESTEAMING MOISTURE (%)* | GRAIN TEMP (F.) | STEAMING TIME (MIN) | |
|---|---|---|---|---|
| | | | 35 PSI** | 15 PSI |
| 4 | 14-15 | 205 | 11-17 | 3-5 |
| 5 | 14-15 | 205 | 11-17 | 5-20 |
| 6 | 15-16 | 205 | 11-17 | 10-20 |
| 7 | 15-16 | 205 | 11-17 | 15-30 |
| 8 | 14-15 | 205 | 11-17 | 5-10 |
| 9 | 15-16 | 205 | 11-17 | 5-10 |
| 10 | 14-15 | 205 | 11-17 | 5-20 |
| 11 | 14-15 | 205 | 11-17 | 5-20 |
| 12 | 15-16 | 205 | 11-17 | 15-30 |
| 13 | 15-16 | 205 | 11-17 | 15-30 |
| 14 | 15-16 | 205 | 11-17 | 10-30 |
| 15 | 14-15 | 205 | 11-17 | 5-10 |

TABLE 7-continued

| EXAMPLE | PRESTEAMING MOISTURE (%)* | GRAIN TEMP (F.) | STEAMING TIME (MIN) 35 PSI** | 15 PSI |
|---|---|---|---|---|
| 16 | 15–16 | 205 | 11–17 | 10–30 |

*The moisture content of the grain immediately prior to steaming and after any moisture adjustment step.
**The time required to bring the temperature of the grain to the temperature specified in the preceding column.

Although the above description and examples of the invention are disclosed herein for the purpose of describing the invention to those with ordinary skill in the art, each and every modification and variation of the invention is not described in detail. It is intended, however, that all modifications and variations within the scope of the claims are to be included within the scope of the invention.

I claim:

1. In a method for making a puffed, cake-shaped food product by heating a predetermined quantity of cereal grains in a hermetically sealed chamber at superatmospheric pressure and then expanding the heated grains while they are confined to the chamber by abruptly releasing the superatmospheric pressure such that the confined, expanded grains bond together to form a self-supporting mass wherein the improvement comprises pretreatment of the cereal grains by steaming cereal grains to bring them to an effective temperature to partially gelatinize the starch therein and to maintain the cereal grains at the effective temperature for an effective period of time to produce a desired degree of expansion in the final product.

2. The method of claim 1 wherein water is first added to the cereal grains to be steamed in an amount required to bring the moisture content of the cereal grains into the range of about 12% to about 18%.

3. The method of claim 1 wherein the effective temperature is a temperature above about 190 degrees F.

4. The method of claim 1 wherein the effective period of time is in the range of about 2 minutes to about 30 minutes.

5. The method of claim 1 wherein the steamed cereal grains are dried prior to expansion to a moisture content of less than about 18%.

6. The method of claim 1 wherein the cereal grains are selected from the group consisting of rice, wheat, corn, rye, oats, millet, sorghum, barley and buckwheat.

7. In a method for making a puffed, cake-shaped food product by heating a predetermined quantity of cereal grains in a hermetically sealed chamber at superatmospheric pressure and then expanding the heated grains while they are confined to the chamber by abruptly releasing the superatmospheric pressure such that the confined, expanded grains bond together to form a self-supporting mass wherein the improvement comprises pretreatment of the cereal grains by the steps of:
   a. adding water to the cereal grains to bring their moisture content into the range of about 12% to about 18%;
   b. steaming the moistened cereal grains to bring them to an effective temperature to partially gelatinize the starch therein and to maintain the cereal grains at the effective temperature for an effective period of time to produce a desired degree of expansion in the final product; and
   c. drying the steamed cereal grains to a moisture content of less than about 18%.

8. The method of claim 7 wherein water is added to the cereal grains to a moisture content in the range of about 14% to about 16%.

9. The method of claim 7 wherein the effective temperature is a temperature above about 190 degrees F.

10. The method of claim 7 wherein the effective period of time is in the range of about 2 minutes to about 30 minutes.

11. The method of claim 7 wherein the cereal grains are selected from the group consisting of rice, wheat, corn, rye, oats, millet, sorghum, barley and buckwheat.

12. An industrial method for making a puffed, cake-like food product comprising highly expanded cereal grains comprising the steps of:
   a. admitting steam to a steaming chamber containing the cereal grains to bring the cereal grains to an effective temperature to partially gelatinize the starch therein;
   b. maintaining the cereal grains at the effective temperature for an effective period of time to produce a desired degree of expansion in the final product;
   c. discharging the steamed cereal grains from the steaming chamber; and
   d. puffing the steamed cereal grains in a rice cake machine.

13. The method of claim 12 also comprising the step of adding water to the cereal grains prior to admitting steam to the steaming chamber to bring their moisture content into the range of about 12% to about 18%.

14. The method of claim 12 also comprising the step of drying the steamed cereal grains to a moisture content of less than about 18% prior to puffing.

15. The method of claim 12 wherein the effective temperature is a temperature above about 190 degrees F.

16. The method of claim 12 wherein the effective period of time is in the range of about 2 minutes to about 30 minutes.

17. An industrial method for making a puffed, cake-like food product comprising highly expanded cereal grains comprising the steps of:
   a. adding water to cereal grains to bring their moisture content into the range of about 12% to about 18%.
   b. admitting steam to a steaming chamber containing a desired quantity of the moistened cereal grains to bring the cereal grains to an effective temperature to partially gelatinize the starch therein;
   c. maintaining the cereal grains at the effective temperature for an effective period of time to produce a desired degree of expansion in the final product;
   d. drying the steamed cereal grains to a moisture content of less than about 18%;
   e. puffing the dried cereal grains in a rice cake machine.

18. The method of claim 1 also comprising the step of adding water to the cereal grains prior to steaming to bring their moisture content into the range of about 14% to about 16%.

19. The method of claim 18 also comprising the step of drying the steamed cereal grains to a moisture content of less than about 18% prior to puffing.

20. The method of claim 18 wherein the effective temperature is a temperature above about 190 degrees F.

21. The method of claim 18 wherein the effective period of time is in the range of about 2 minutes to about 30 minutes.

* * * * *